United States Patent [19]

Horsch

[11] Patent Number: 4,884,072

[45] Date of Patent: Nov. 28, 1989

[54] DEVICE FOR PHOTOGRAPHIC MONITORING OF CROSS-ROADS

[76] Inventor: Heinrich Horsch, Pfaffenberger Weg 224, 5650 Solingen 1, Fed. Rep. of Germany

[21] Appl. No.: 50,769

[22] PCT Filed: Aug. 7, 1986

[86] PCT No.: PCT/EP86/00467

§ 371 Date: Jun. 8, 1987

§ 102(e) Date: Jun. 8, 1987

[87] PCT Pub. No.: WO87/01847

PCT Pub. Date: Mar. 26, 1987

[30] Foreign Application Priority Data

Sep. 12, 1985 [DE] Fed. Rep. of Germany ....... 3532527

[51] Int. Cl.$^{4}$ .............................................. G01D 3/00

[52] U.S. Cl. .............................. 340/937; 346/107 VP

[58] Field of Search .................. 340/937, 928; 346/40, 346/107 VP; 354/76, 105

[56] References Cited

U.S. PATENT DOCUMENTS

| | | | |
|---|---|---|---|
| 2,871,088 | 1/1959 | Abell | 340/937 X |
| 3,060,434 | 10/1962 | Biedermann et al. | 346/107 VP |
| 3,858,223 | 12/1974 | Holzapfel | 340/937 X |
| 3,866,165 | 2/1975 | Maronde et al. | 340/937 |

FOREIGN PATENT DOCUMENTS

| | | |
|---|---|---|
| 2307217 | 8/1974 | Fed. Rep. of Germany . |
| DE33277-06A1 | 2/1985 | Fed. Rep. of Germany . |
| 2201510 | 4/1974 | France . |

OTHER PUBLICATIONS

Machine Design, Band 38, Nr. 2, "Camera Gets Black and White Evidence Against Speeding Motorist" Jan. 1966.

*Primary Examiner*—Joseph A. Orsino
*Assistant Examiner*—Brian R. Tumm
*Attorney, Agent, or Firm*—Lee, Mann, Smith McWilliams & Sweeney

[57] ABSTRACT

In order to ensure the photographic monitoring of cross-roads a camera (26 or 28) is provided which covers an intersection (10). An initial sensor (22) responds when a vehicle (30 or 32) goes beyond a halt line during the stop phase of the traffic lights (16), in which case an initial photograph is taken by the camera (26) or (28). A second sensor (24) is arranged directly ahead, behind the first sensor (2) in the danger area of the intersection (10) and in an optimum photographic position in relation to the camera (26 or 28) and when this sensor is passed a second photograph is triggered. As a result, the vehicle (30 or 32) is photographed whatever its speed and always in an optimum photographic position.

4 Claims, 2 Drawing Sheets

DEVICE FOR PHOTOGRAPHIC MONITORING OF CROSS-ROADS

TECHNICAL FIELD

The invention relates to a device for photographic monitoring of a road intersection controlled by means of a traffic light installation, comprising:

(a) a photographic camera covering the road intersection, (b) a first sensor, which responds to a vehicle entering the road intersection beyond a first position, and supplies a sensor signal, (b) means for producing a stop interval signal in response to the change-over of the traffic light installation to a stop interval, (d) a camera-triggering device, which is arranged to be energized by trigger signals to trigger exposures of the photographic camera, (e) signal processing means to which the sensor signal and the stop interval signal are applied, and which are arranged to produce a first triggering signal for triggering a first exposure of the camera when a sensor signal appears during the duration of the stop interval signal, (f) means for producing a second triggering signal with delay with respect to the first triggering signal to trigger a second exposure, (g) and a second sensor.

BACKGROUND ART

It is known to monitor road intersections controlled by traffic lights. To this end a sensor is arranged on the lane in the range of the traffic light, which sensor supplies a sensor signal when a vehicle passes over it. If such a signal appears during the stop interval of the traffic light, that is if a vehicle enters the road intersection during the stop interval contrary to traffic regulations, a photographic camera will be triggered, the field of view of which covers the road intersection controlled by traffic lights. Thereby a photograph is taken of the traffic violation and also of the license plate of the vehicle in question (DE-A- 683,658).

It is also known to trigger by the sensor signal successively several photographic exposures in adjustable time intervals, if a sensor arrangement establishes a traffic violation of a vehicle. This traffic violation may consist in that the vehicle enters a road intersection during the stop interval. Then the photographic camera is triggered by a signal when passing a contact sensor embedded in the lane. The traffic violation may also consist in that the vehicle runs too fast. In this case the photographic camera is triggered by two contact thresholds embedded one behind the other at a fixed distance in the lane, being passed within a predetermined time interval corresponding to the speed limit (DE-A- 10 78 797 or AT-A- 225,077). The two contact sensors embedded one behind the other in driving direction exclusively serve for the speed measurement.

By DE-C- 2,365,331 a device is known for photographic monitoring of road intersections controlled by traffic lights, which device has a photographic camera covering the road intersection and a sensor responding to a vehicle entering the road intersection, and supplies a sensor signal by means of a detector circuit. A camera-triggering device is aranged to be energized by a first triggering signal triggered by the sensor signal through a first gate circuit for triggering a first exposure. The first gate circuit is arranged to be rendered conductive by a signal from the traffic light during its stop interval. When the first exposure is triggered, a time function element is triggered and changes its state for a predetermined delay time. After expiration of the delay time, a second triggering signal applied to the camera-triggering device for triggering an exposure is produced by the time function element. The first gate circuit is then non-conductive from the triggering of the first exposure to the end of the second exposure. In this manner a second vehicle entering the road intersection shortly after the first triggering vehicle cannot directly cause a triggering signal directly, before the cycle consisting in the first and the second exposures initiated by the first vehicle is finished. The sensor signal is, however, simultaneously applied to a second gate circuit which is rendered conductive during the non-conductive period of the first gate circuit. The outlet of this second gate circuit is also applied to the camera-triggering device through a signal-retarding time function element having a delay time which is longer than the time required for the two exposures. The sensor pulse of the second vehicle is thus, so to say, memorized until the first two exposures inclusive the film transport are certainly finished. Then a third exposure is made. The second vehicle is then certainly visible on one of the two exposures triggered by the first vehicle and supplementary on the third exposure, such that two exposures are also made of the second vehicle. This device is also described in the U.S. Pat. No. 3,858,223.

The U.S. Pat. No. 3,858,223, as well as the DE-B-2,307,217 furthermore show a device for photographic monitoring road intersections controlled by traffic lights, in which a vehicle, when entering the road intersection, successively triggers two exposures. A second sensor is provided in a lane transverse to the lane to be monitored, by which sensor the cameratriggering device may be energized through a gate circuit which is rendered conductive during the delay time between the first and second exposures. Thereby vehicles driving fast are detected, which enter the road intersection in the stop interval and turn off immediately in a line crossing the non authorized road before the delay time of the time function element expires, and the second exposure is triggered. In this case an additional exposure is triggered through the second sensor before expiration of the predetermined delay time. This exposure then covers the vehicle turning off. In this device two sensors are located in two intersecting lines. The employment of the second sensor (contact sensor or induction loop) has the specific purpose to detect vehicles turning off. Vehicles driving straight on do not cause response of the second sensor and are not covered by the exposure triggered after a predetermined delay time.

Cameras for photographic monitoring of road intersections controlled by traffic lights are furthermore described in the U.S. Pat. No. 2 871 088, The U.S. Pat. No. 3,849,784 and the U.S. Pat. No. 3,866,165.

In the devices of the prior art mentioned above, the vehicles are photographed from the rear, the back license plate appearing on the photographic. The driver of the vehicle is, in general, not recognizable on such photographs. Therefore it is known (DE-A- 2,129,984 and DE-C- 2,802,448) to arrange the camera such that a so called "frontal photographing" takes place, thus the vehicles are photographed from the front opposite to the driving direction. Such a frontal photographic, if it is made with flash illumination, requires special precautions in order to prevent dazzling of the driver, and furthermore to make sure that the driver can be recognized through the frontal windshield of the vehicle. Therefore a red filter is conventionally arranged before flash and camera and a red-sensitive film is used.

The devices of the prior art in which two exposures made in a fixed time interval are triggered successively by a vehicle entering the road intersection during the stop interval, still present certain disadvantages:

It may happen that a vehicle driving very fast has driven straight on out of the field of image during the delay time between first and second exposures. With photographing from the rear the vehicle is then at such a distance that its license plate cannot be recognized any more on the second exposure, the evidence value of the second exposure becoming doubtful. With frontal photographing it may happen, that a vehicle driving fast has already passed the camera during the delay time and is not covered any more at all. Vehicles passing a road intersection at high speed during the stop interval represent, however, a particular source of danger. Therefore it is important to include especially such vehicles.

But also with slowly driving vehicles, the devices of the prior art may fail. When the vehicle at low speed has caused the sensor to respond and thus the delay time starts to run, it may happen that at the moment of the second exposure this vehicle is not yet in the danger area. Then the vehicle can continue to drive over the road intersection without the authorities being able to prove this from the exposures.

Finally, in the devices of the prior art, the distance of the photographed vehicle from the camera depends on the speed of the vehicle. This is particularly disadvantageous with frontal photographing, where it is necessary to identify a person behind the windshield on the photograph under frequently unfavourable illumination conditions.

DISCLOSURE OF THE INVENTION

It is the object of the invention to form a device of the above defined type, such that vehicles passing the road intersection very fast during the stop interval, as well as vehicles passing the road intersection very slowly during the stop interval, may be photographed conclusively within the danger area. According to the invention this object is achieved in that (h) the means for producing the second triggering signal comprise the second sensor which responds to the passage of the vehicle past a second position located in straight direction behind the first position, and which is arranged to apply a second sensor signal to the signal processing means.

Thus it is made sure that the vehicles are photographed, independently of their speed, also with the second exposure at an exactly defined position. In this way the exposure conditions can be optimized. The camera can be focused to the associated distance. The fast as well as the slow drivers are photographed within the danger area where the second sensor is arranged. Thus a traffic violation can be proven conclusively against both kinds of drivers.

Contrary to the second embodiment of the DE-A-1,078,797, in the device according to the invention the camera is controlled also in dependence on a stop interval signal which is picked off from a traffic light installation. The camera is triggered both upon responding of the first and of the second sensor, while in the DE-A-1,078,797 the camera is triggered only after both sensors have responded within a predetermined time interval and thus signalize excessive speed.

Contrary to the U.S. Pat No. 3,858,223 and the DE-B- 2,307,217, the second sensor responds to the passage of the vehicle though a position located in straight direction behind the first sensor. The second sensor is thus not located in a lane crossing the monitored lane. It is the object of the invention to cover also vehicles driving very slowly and very fast, and not as in the DE-B- 2,307,217 and in the U.S. Pat. No. 3,858,223 to cover cars turning off.

Modifications of the invention are subject matter of the dependent claims.

An embodiment of the invention will now be described in greater detail with reference to the accompanying drawings:

SHORT DESCRIPTION OF THE DRAWINGS

PREFERRED EMBODIMENT OF THE INVENTION

Figure 1:
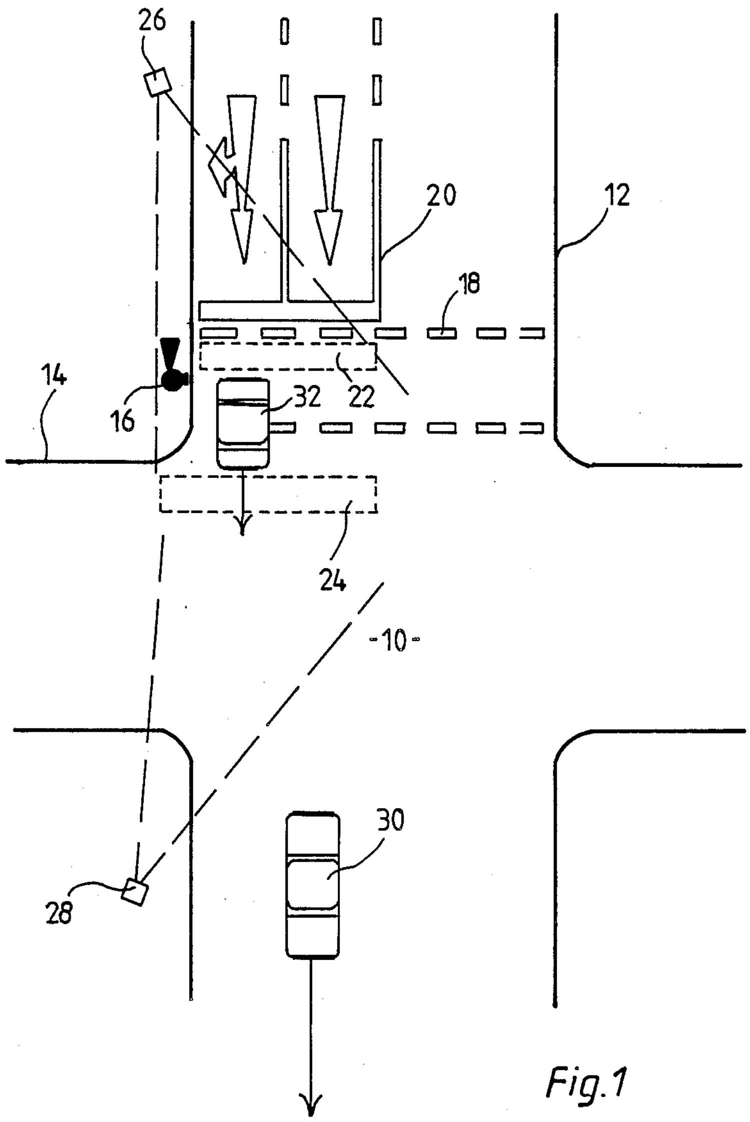
FIG. 1 is a schematic illustration of a road intersection controlled by traffic lights with a photographic monitoring device.

In FIG. 1 numeral 10 designates a road intersection in which two roads 12 and 14 are intersecting. The road intersection 10 is controlled by a traffic light installation of which only one traffic light 16 in front of the road intersection in the road 12 is illustrated. A pedestrian crossing 18 is marked in the area of the traffic light 16. Furthermore a road marking 20 for two lanes with halt lines on the road 12 in front of the pedestrian crossing 18 is illustrated.

A first sensor in the form of an induction loop or the like 22 is inlaid in the road surface in driving direction behind the marking on the entering side of the pedestrian crossing 18 and behind the road marking 20. A second sensor 24 inlaid in the road surface is arranged in the danger area of the road intersection in straight direction behind the first sensor 22.

Numeral 26 designates a photographic camera controlled through signal processing means by sensor signals from the sensors 22 and 24 and a stop interval signal from the traffic light installation 16. When a vehicle passes over the induction loop 22 during the stop interval, when a stop interval signal is produced, the camera 26 is triggered for a first exposure. A second exposure is triggered when the vehicle passes over the second induction loop 24, that is when it is in the danger area of the road intersection 10. The second exposure is, however, only triggered when previously the first exposure has been triggered by passing over the induction loop 22. In this way the triggering of the camera by transverse traffic in the road 14 is prevented. The second sensor 24 is thus only enabled by the first sensor signal from the first sensor.

In FIG. 1, a second alternative is indicated. Instead of the camera 26 arranged behind the vehicles, also a photographic camera 28 adapted for the frontal photographing of the vehicle can be arranged such that it photographs the vehicle from the front opposite to the driving direction.

When a vehicle 30, as indicated in FIG. 1, passes the road intersection at very high speed during the stop interval, and according to the prior art the first and the second exposures are triggered successively in a fixed time interval, then the vehicle 30 can already be so remote from the camera 26 that an exact identification of the vehicle on the second exposure is not possible any more. The vehicle has in the illustrated position, already driven out of the field of view of the camera 28, such that, with frontal photographing, it would not be covered any more at all by the second exposure. Also a vehicle 32 entering the road intersection 10 very slowly, as indicated in FIG. 1, could cause the first sensor 22 to respond, but could not reach the real danger area of the road 14 during the fixedly predetermined delay time. On the two successive exposures the vehicle 32 would then be photographed on the one hand in the area of the sensor 22 and on the other hand in the area of the road corner but still out of the real danger area of the road 14. The vehicle 32 could then continue to pass the road intersection during the stop interval, without anybody being able to prove this.

With frontal photographing, the vehicle 30 would not be covered at all by the camera 28, the vehicle 32 would possibly be covered at an unfavourable distance. In the described arrangement in which the second exposure is triggered while the sensor 24 is passed, the vehicle 30 as well as the vehicle 32 would be photographed essentially in the same position within the danger area of the road intersection 10 and at optimal distance from the camera 26 or 28.

Figure 2:
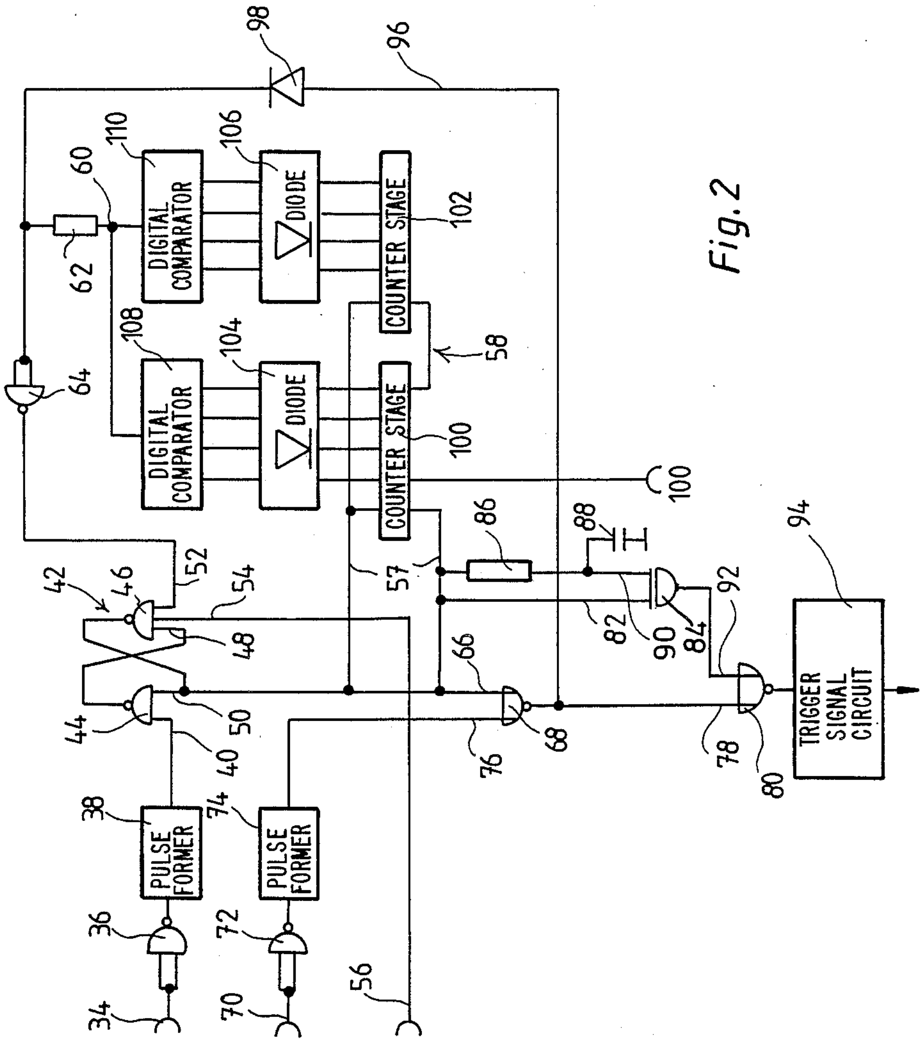
FIG. 2 shows a wiring diagram of the signal processing means in a monitoring device according to FIG. 1.

FIG. 2 shows the associated signal processing means. In FIG. 2 the first sensor, which comprises a detector circuit (non illustrated), is connected to an input 34. An optocoupler is provided between the input 34 and the signal processing means. This optocoupler causes an inversion of the signal: a positive pulse is converted into a negative pulse. The optocoupler is therefore symbolized by an inverter 36. The inverted sensor signal is converted by a pulse former 38 to a rectangular pulse to be processed unobjectionably. This is known in the prior art (comp. U.S. Pat. No. 3,858,223) and therefore is not described in detail herein. The sensor signal thus obtained is applied to an input 40 of a flipflop 42. The flipflop 42 is conventionally formed by two NAND-gates 44 and 46. The output of the NAND-gate 44 is connected to an input 48 of the NAND-gate 46. The output of the NAND-gate 46 is connected to an input 50 of the NAND-gate 44. The input 40 forms another input of the NAND-gate 44. The NAND-gate 46 has a second input 52, through which the flipflop 42 can be reset in a way still to be described. Finally the NAND-gate 46 has a third input 54 connected to an input 56 for a stop interval signal. The signal applied to the input 50 of the NAND-gate 44 is applied to a reset input 57 of a counter 58. The counter 58 is formed in known manner as electronic preselection counter which provides an output signal at an output 60 at a predetermined count. This signal is applied through a resistor 62 and an inverter 64 to the second input 52 of the NAND-gate 46 in the flipflop 42.

The output signal of the NAND-gate 46 applied to an input 50 is furthermore connected to the input 66 of a NOR-gate 68.

The second sensor 24, which comprises a detector circuit (not illustrated) is applied to an input 70. The second sensor signal is applied through an optocoupler illustrated as inverter 72 and a pulse former 74 to the second inlet 76 of the NOR-gate 68. The output of the NOR-gate 68 is applied to an input 78 of a NOR-gate 80.

The signal applied to the input 50 of the NAND-gate 44 is furthermore applied to an input 82 of an exclusive OR-gate.

The same signal is applied through RC-network consisting of a resistor 86 and a capacitor 88 to the second input 90 of the exclusive OR-gate 84. The output of the exclusive OR-gate 84 is applied to the second input 92 of the NOR-gate 80. The output of the NOR-gate 80 controls a circuit 94 for producing a trigger signal for the camera.

The output of the NOR-gate 68 is connected through a conductor 96 and a diode 98 also to the input of the inverter 64.

The counter 58 comprises two counter stages 100 and 102 for counting the seconds and tenths of a second. The counter stage 100 gets an input signal having twice the mains frequency of 100 cycles per second. Through diode arrangements 104 and 106 the count is compared to predetermined numbers in digital comparators 108 and 110. When obtaining a predetermined number an output signal is produced at the output 60. Thus delay times from 0.5 to 9.9 seconds can be set at the counter.

The signal processing means described with reference to FIG. 2 operate as follows:

At first, the state shall be observed, in which the traffic light 16 (FIG. 1) is at green and correspondingly no stop interval signal appears. The signal "L" (low) is then applied to the input 56 of the circuit and at the input 54 of the NAND-gate. The counter 58 does not supply an outlet signal at the output 60. Consequently the signal "H" (high) is applied to the output of the inverter 64 and at the output 52 of the NAND-gate 46. As long as the first sensor 22 does not supply a signal, the signal "L" is applied to the input 34 and converted by the inverter 36 into a signal "H" at the input 40 of the NAND-gate 44. The output of the NAND-gate 46 is in the state "H", and this signal is also applied to the input 50 of the NAND-gate 44. As both inputs 40 and 50 are in the state "H", the output of the NAND-gate 44 and therewith the input 48 of the NAND-gate 46 is in state "L". This is a stable state of the flipflop.

If now a positive pulse from the first sensor 22 appears at the input 34, it is inverted by the inverter 36 into a negative pulse at the input 40 of the NAND-gate 44. The input 40 changes over into state "L". Therewith the output of the NAND-gate 44 changes over into state "H" for the duration of the pulse forming the sensor signal. The output of the NAND-gate 46 remains, however, also in state "H" such that the flipflop 42 is not switched over, but, after the pulse has ended, returns to its initial state. The output signal of the NAND-gate 46, that is "H", is also applied to the reset input 57 of the counter 58. The counter 58 is thus maintained on the count zero.

When a stop interval signal appears, that is when the input 56 of the circuit and the input 54 of the NAND-gate 46 change over into the state "H", at first nothing is changed of the circuit state of the flipflop 42. The output of the NAND-gate 44 and therewith the input 48 of the NAND-gate 46 remains "L" such that the output of the NAND-gate 46 is in state "H". When a sensor pulse appears at the input 34, it is inverted into a negative pulse by inverter 36. The input 40 of the NAND-gate 44 changes over momentarily into state "L". Thereby the output of the NAND-gate changes over into state "H" and therewith also the input 48 of the NAND-gate 46. Now all three inputs 48,54 and 52 of the NAND-gate 46 are in state "H". The output of the NAND-gate 46 therefore changes over into state "L". It will be noted, that this is a second stable state of the flipflop 42. As the output of the NAND-gate 46 is applied to the reset input 57 of the counter 58, the counter 58 starts to count, as the signal "H" changes over at the reset input 57 into a signal "L".

Simultaneously, the circuit 94 is energized through the exclusive OR-gate 84 and the NOR-gate 80, such that the circuit supplies a triggering signal. The output of the exclusive OR-gate 84 is normally zero, as in static state with charged capacitor 88 both inputs 82 and 90 of the exclusive OR-gate 84 are on the same potential. They are both connected to the output of the NAND-gate 46, a RC-network 86,88 being, however, connected in front of the input 90. When the output of the NAND-gate 46 changes over from the state "H" into the state "L", the inputs 82 and 90 are momentarily on different potential. The input 82 changes over immediately into state "L", while the input 90 still remains, for a moment, in state "H" because of the charged capacitor 88. The exclusive OR-gate 84 thus supplies an output pulse when the flipflop 42 changes state.

When the vehicle passes over the second sensor 24, a second sensor signal appears in the form of a positive pulse at the input 70. This positive pulse is inverted by the inverter 72 to a negative pulse. The input 76 of the NOR-gate 68 therefore changes over momentarily into state "L". When previously the first sensor 22 has responded, then the output of the NAND-gate 46 is, as described, also in state "L". This signal "L" is applied to the second input of the NOR-gate 68. When also the input 76 changes over into state "L", the output of the NOR-gate 68 changes over into state "H". Thus a second pulse is applied through the NOR-gate 80 to the circuit 94 such that a second triggering signal for triggering a second exposure of the camera is produced. Simultaneously the input 52 of the NAND-gate 46 is momentarily changed over into state "L" through the conductor 96, the diode 98 and the inverter 64. The flipflop 42 thus is reset to its initial state. The output of the NAND-gate 46 changes over into state "H". Thereby the output of the NAND-gate 44 changes over into state "L". The output of the NAND-gate 46 thus remains "H" also after the pulse at the output of the NOR-gate 68 has ended, when the input 52 returns into state "H". The counter 58 is reset to zero through the reset input 57.

Thus one trigger signal each is produced when the first and the second sensors 22 and 24, respectively are passed, and one exposure each is made. This is the normal mode of operation. Following the second exposure, the signal processing means are again in their initial state.

When a sensor signal of the second sensor 24 appears without the first sensor 22 having previously supplied a sensor signal, then the signal processing circuit is in its initial state, when the second sensor signal appears, that means that the output of the NAND-gate 46 is in state "H". The output of the NOR-gate 68 is therefore in state "L". This is independent of the state of the input 76 of the NOR-gate 68. When the second sensor signal appears, and accordingly the input 76 of the NOR-gate a68 changes over into state "L", the state of the output of the NOR-gate 68, namely "L", is not affected thereby. A response of the second sensor 24 without previous response of the first sensor therefore does not cause triggering of the camera 26 or 28.

With a vehicle driving slowly, as the vehicle 32, the second exposure is triggered as soon as the vehicle passes over the sensor 24. If, however, the vehicle 32 after actuating the sensor 22, stops in the position illustrated in FIG. 1, that is still out of the danger area of the road intersection 10, then the following will happen: The second sensor signal does not appear. Consequently the flipflop 42 is not reset in the described manner through conductor 96, diode 98 and inverter 64, and the counter 58 is not reset to zero. The counter 58 then continues to count until the preselected count which corresponds to a predetermined delay time, is obtained. Then the input 52 of the flipflop 42 is changed over into state "L" through the output 60, the resistor 62 and again the inverter 64. Thereby the output of the NAND-gate 46 changes over into state "H", whereby the output of the NAND-gate 44 changes over again into state "L". The flipflop 42 is thus set to its second stable state. At the input 82 of the exclusive OR-gate 84 and at the RC-network 86,88 which is connected in front of the input 90 of the exclusive OR-gate 84, the signal voltage therefore changes from "L" to "H". This modification is again effective at the input 82 without delay, while the capacitor 88 is discharged and first must be charged through the resistor 86 such that the input 90 of the exclusive OR-gate remains momentarily in state "L". Therefore different signals are applied to the inputs 82 and 90 such that also in this case the exclusive OR-gate 84 supplies an output pulse which causes a triggering signal through the NOR-gate 80.

In such a case the vehicle 32 is thus again photographed in its position in front of the second sensor. Thus it can be proven that the vehicle 32 has not entered the danger area of the road intersection 10 but has stopped actually behind the halt line but in front of the road corner.

Also after this process the signal processing means are again in their initial state.

The described arrangement can be modified in different ways.

As mentioned above, either a camera 26 can be arranged in driving direction in front of the road intersection, which camera photographs the vehicle from the rear, or a camera 28 can also be provided in driving direction behind the road intersection from the frontal photographing. But it may also be useful to install both cameras 26 and 28 simultaneously in order to make exposures from the rear as well as from the front. The camera 28 may, if necessary, be controlled such that it is only triggered by the second sensor signal.

Instead of the logic permanently wired illustrated in FIG. 2, also a microprocessor programmed with appropriated software may be used as signal processing means.

Finally it is possible to use the described device in combination with other measures as for example described in the U.S. Pat. No. 3,858,223.

I claim:

1. Device for photographic monitoring of an intersection controlled by traffic lights comprising:

(a) a photographic camera the field of view of which covers the intersection, (b) a first sensor which responds to a vehicle moving into the intersection beyond a first position and which provides a sensor signal, (c) means for generating a stop phase signal depending on the traffic lights being switched to stop phase, (d) a camera-triggering device, which is arranged to be controlled by triggering signals to trigger the photographic camera, (e) signal processing means to which the sensor signal and the stop phase signal are applied for providing a first triggering signal for triggering a first exposure of the camera, when a sensor signal appears during the duration of the stop phase signal, (f) and a second sensor arranged to apply a second sensor signal to the signal processing means to provide a second triggering signal delayed with respect to the first triggering signal for triggering a second exposure, (g) the second sensor is located within the intersection and responds to the passage of the vehicles through a second position located in straight direction behind the first position.

2. Device as set forth in claim 1, characterized in that the photographic camera (28) is adapted and arranged for the frontal photographing of the vehicle (30;32).

3. Device as set forth in claim 1, characterized in that the second sensor (24) is arranged to be enabled only by the first sensor signal of the first sensor (22).

4. Device as set forth in claim 3, characterized in that the signal processing means are arranged to produce said second triggering signal for triggering said second exposure after a predetermined delay time, if the first sensor (22) responds during the duration of the stop interval signal, and if the second sensor (24) does not respond within the predetermined delay time.

* * * * *